(12) United States Patent
Greenberg et al.

(10) Patent No.: US 10,669,945 B2
(45) Date of Patent: Jun. 2, 2020

(54) STARTER AIR VALVE SYSTEM WITH DUAL ELECTROMECHANICAL CONTROLS

(71) Applicant: United Technologies Corporation, Farmington, CT (US)

(72) Inventors: Michael D. Greenberg, Bloomfield, CT (US); David Gelwan, West Hartford, CT (US); Jesse W. Clauson, Agawam, MA (US); Robert Goodman, West Hartford, CT (US); John M. Dehais, Windsor, CT (US); Myles R. Kelly, Willimantic, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 394 days.

(21) Appl. No.: 15/425,043

(22) Filed: Feb. 6, 2017

(65) Prior Publication Data

US 2018/0223738 A1 Aug. 9, 2018

(51) Int. Cl.
| | |
|---|---|
| *F02C 7/277* | (2006.01) |
| *F01D 19/00* | (2006.01) |
| *F02C 7/26* | (2006.01) |
| *F01D 5/02* | (2006.01) |
| *F01D 15/12* | (2006.01) |

(52) U.S. Cl.
CPC .............. *F02C 7/277* (2013.01); *F01D 5/02* (2013.01); *F01D 15/12* (2013.01); *F01D 19/00* (2013.01); *F02C 7/26* (2013.01); *F05D 2220/32* (2013.01); *F05D 2260/4031* (2013.01); *F05D 2260/57* (2013.01); *F05D 2260/96* (2013.01); *F05D 2270/02* (2013.01)

(58) Field of Classification Search
CPC .......... F01D 19/00; F01D 19/02; F01D 25/34; F01D 25/36; F02C 7/26; F02C 7/262; F02C 7/264; F02C 7/266; F02C 7/268; F02C 7/27; F02C 7/272; F02C 7/275; F02C 7/277; F05D 2260/85
See application file for complete search history.

(56) References Cited

U.S. PATENT DOCUMENTS

| | | | | |
|---|---|---|---|---|
| 3,903,691 A | * | 9/1975 | Szydlowski | ............ F01D 25/34 60/806 |
| 4,617,958 A | * | 10/1986 | Seidel | .................. G05D 16/163 137/488 |
| 4,702,273 A | | 10/1987 | Allen, Jr. et al. | |

(Continued)

OTHER PUBLICATIONS

EP Application No. 18155178.9 Extended EP Search Report dated Jun. 14, 2018, 8 pages.

*Primary Examiner* — Scott J Walthour
(74) *Attorney, Agent, or Firm* — Cantor Colburn LLP

(57) ABSTRACT

According to an aspect, a system includes a starter air valve in fluid communication with an air turbine starter to drive motoring of a gas turbine engine responsive to a compressed air flow from a compressed air source. The system also includes a variable-position electromechanical device operable to adjust positioning of the starter air valve and a discrete-position electromechanical device operable to adjust positioning of the starter air valve and limit a motoring speed of the gas turbine engine below a resonance speed of the gas turbine engine responsive to a pulse width modulation control based on a failure of the variable-position electromechanical device.

9 Claims, 5 Drawing Sheets

(56) References Cited

U.S. PATENT DOCUMENTS

| | | |
|---|---|---|
| 8,776,530 B2 | 7/2014 | Shirooni et al. |
| 2005/0276685 A1 | 12/2005 | Wiggins et al. |
| 2010/0085676 A1 | 4/2010 | Wilfert |
| 2010/0326085 A1 | 12/2010 | Veilleux |
| 2014/0373518 A1 | 12/2014 | Manneville et al. |
| 2014/0373553 A1 | 12/2014 | Zaccaria et al. |
| 2015/0040578 A1 | 2/2015 | Betti et al. |

\* cited by examiner

STARTER AIR VALVE SYSTEM WITH DUAL ELECTROMECHANICAL CONTROLS

BACKGROUND

This disclosure relates to gas turbine engines, and more particularly to a starter air valve system with dual electromechanical controls for gas turbine engine motoring.

Gas turbine engines are used in numerous applications, one of which is for providing thrust to an airplane. When the gas turbine engine of an airplane has been shut off for example, after the airplane has landed at an airport, the engine is hot and due to heat rise, the upper portions of the engine will be hotter than lower portions of the engine. When this occurs thermal expansion may cause deflection of components of the engine which can result in a "bowed rotor" condition. If a gas turbine engine is in such a bowed rotor condition, it is undesirable to restart or start the engine.

One approach to mitigating a bowed rotor condition is to use a starter system to drive rotation (i.e., cool-down motoring) of a spool within the engine for an extended period of time at a speed below which a resonance occurs (i.e., a critical speed or frequency) that may lead to damage when a sufficiently large bowed rotor condition is present. However, it can be challenging to repeatedly use a starter system to hold the engine speed below a typical starting speed for an extended period of time, as starter systems are typically designed to fully accelerate the engine beyond the critical speed to reach the starting speed. Using a typical starter system for an extended motoring time below the critical speed may result in increased component wear, component service life reduction, and/or increased reliability concerns.

BRIEF DESCRIPTION

In an embodiment, a system includes a starter air valve in fluid communication with an air turbine starter to drive motoring of a gas turbine engine responsive to a compressed air flow from a compressed air source. The system also includes a variable-position electromechanical device operable to adjust positioning of the starter air valve and a discrete-position electromechanical device operable to adjust positioning of the starter air valve and limit a motoring speed of the gas turbine engine below a resonance speed of the gas turbine engine responsive to a pulse width modulation control based on a failure of the variable-position electromechanical device.

In addition to one or more of the features described above, or as an alternative to any of the foregoing embodiments, further embodiments may include where the compressed air source is an auxiliary power unit, a ground cart, or a cross-engine bleed.

In addition to one or more of the features described above, or as an alternative to any of the foregoing embodiments, further embodiments may include a pneumatic actuator operable to drive rotation of a valve plate of the starter air valve to establish a valve-controlled starter air flow to the air turbine starter based on the compressed air flow.

In addition to one or more of the features described above, or as an alternative to any of the foregoing embodiments, further embodiments may include where the variable-position electromechanical device and the discrete-position electromechanical device are pneumatically coupled to the pneumatic actuator.

In addition to one or more of the features described above, or as an alternative to any of the foregoing embodiments, further embodiments may include where the variable-position electromechanical device is positioned in a pneumatic flow path between the discrete-position electromechanical device and the pneumatic actuator, and the variable-position electromechanical device defaults to an open position.

In addition to one or more of the features described above, or as an alternative to any of the foregoing embodiments, further embodiments may include where the variable-position electromechanical device is a torque motor, and the discrete-position electromechanical device is a solenoid.

In addition to one or more of the features described above, or as an alternative to any of the foregoing embodiments, further embodiments may include a controller operable to dynamically command the variable-position electromechanical device and to command pulse width modulation of the discrete-position electromechanical device based on one or more of: the motoring speed of the gas turbine engine and a speed of the air turbine starter.

In an embodiment, a gas turbine engine includes a starting spool coupled to a gearbox, an air turbine starter coupled to the gearbox, and a starter air valve in fluid communication with the air turbine starter to drive motoring of starting spool through the gearbox responsive to a compressed air flow from a compressed air source. The gas turbine engine also includes a variable-position electromechanical device operable to adjust positioning of the starter air valve, a discrete-position electromechanical device operable to adjust positioning of the starter air valve and limit a motoring speed of the gas turbine engine below a resonance speed of the gas turbine engine responsive to a pulse width modulation control based on a failure of the variable-position electromechanical device, and a controller operable to command positioning of the variable-position electromechanical device and the discrete-position electromechanical device.

In an embodiment, a method includes controlling a variable-position electromechanical device to adjust positioning of a starter air valve in fluid communication with an air turbine starter to drive motoring of a gas turbine engine responsive to a compressed air flow from a compressed air source. Based on a failure of the variable-position electromechanical device, a pulse width modulation control is applied to a discrete-position electromechanical device to adjust positioning of the starter air valve and limit a motoring speed of the gas turbine engine below a resonance speed of the gas turbine engine.

In addition to one or more of the features described above, or as an alternative to any of the foregoing embodiments, further embodiments may include driving rotation of a valve plate of the starter air valve, by a pneumatic actuator, to establish a valve-controlled starter air flow to the air turbine starter based on the compressed air flow.

In addition to one or more of the features described above, or as an alternative to any of the foregoing embodiments, further embodiments may include dynamically commanding the variable-position electromechanical device and commanding pulse width modulation of the discrete-position electromechanical device based on one or more of: the motoring speed of the gas turbine engine and a speed of the air turbine starter.

A technical effect of the systems and methods is achieved by using a starter air valve with dual electromechanical controls for gas turbine engine motoring as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
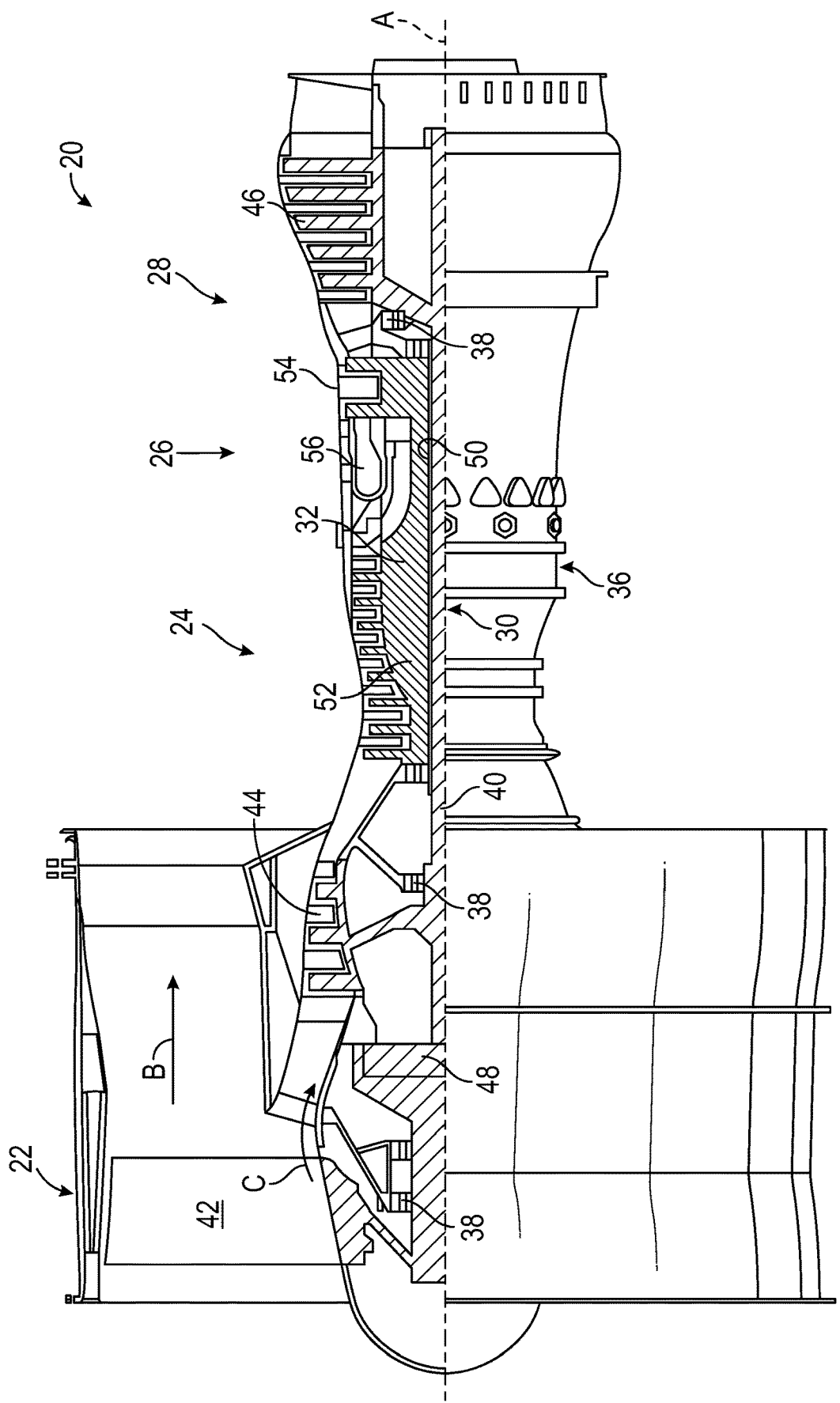
FIG. 1 is a cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 (which may also be referred to as starting spool 32) includes an outer shaft 50 (also referred to as rotor shaft 50) that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Various embodiments of the present disclosure are related to a bowed rotor start mitigation system in a gas turbine engine, such as the gas turbine engine 20 of FIG. 1. Embodiments can include using a starter air valve to control a rotor speed of a starting spool of a gas turbine engine to mitigate a bowed rotor condition using a cool-down motoring process. Under normal operation during cool-down motoring, the starter air valve can be actively adjusted to deliver air pressure (i.e., compressed air) from an air supply to an air turbine starter of an engine starting system that controls starting spool rotor speed. Cool-down motoring may be performed by running an engine starting system at a lower speed with a longer duration than typically used for engine starting while dynamically adjusting the starter air valve to maintain a rotor speed and/or profile. A critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in a high pressure compressor, for example.

In embodiments, a starter system includes dual electromechanical controls for regulating a starter air valve at a motoring speed of the gas turbine engine below a resonance speed of a starting spool of the gas turbine engine. The electromechanical controls of the starter system also support a normal starting sequence of the gas turbine engine. Embodiments use a variable-position electromechanical device operable to adjust positioning of the starter air valve for normal starting and/or motoring of the gas turbine engine through selectively limiting delivery of a compressed air flow to an air turbine starter. Embodiments also include a discrete-position electromechanical device operable to adjust positioning of the starter air valve and limit a motoring speed of the gas turbine engine below a resonance speed of the gas turbine engine responsive to a pulse width modulation control based on a failure of the variable-position electromechanical device. Increased motoring speed stability can be realized through establishing a feedback loop with respect to the motoring speed of the gas turbine engine and/or a speed of the air turbine starter while controlling the variable-position electromechanical device and/or the discrete-position electromechanical device.

Figure 2:
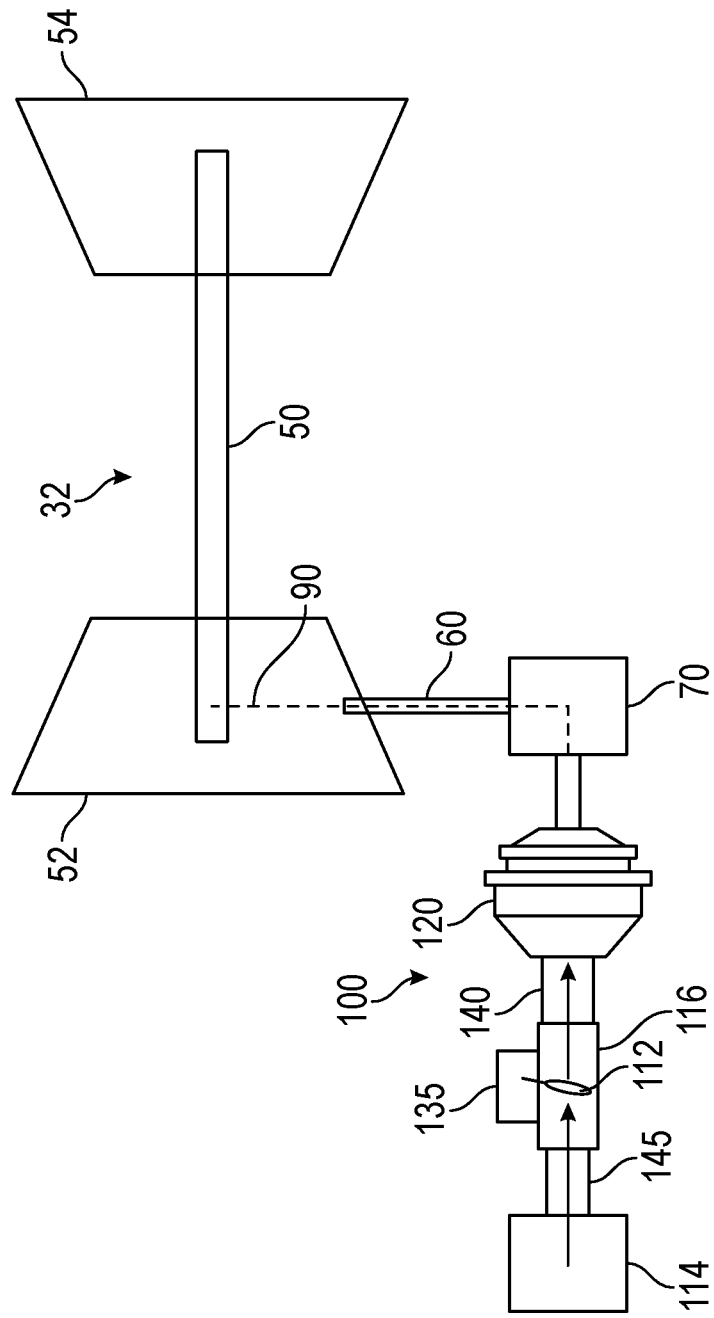
FIG. 2 is a schematic illustration of an aircraft engine starting system in accordance with an embodiment of the disclosure.

Referring now to FIG. 2, a block diagram of an engine starting system 100 is depicted in relation to the starting spool 32 of FIG. 1 according to an embodiment of the present disclosure. The engine starting system 100 includes a starter air valve 116 operably connected in fluid communication with an air turbine starter 120 through at least one duct 140. The starter air valve 116 is operable to receive a compressed air flow from a compressed air source 114 through one or more ducts 145. The compressed air source 114 can be an auxiliary power unit, a ground cart, or a cross-engine bleed, for example. Rotation of a valve plate 112 of the starter air valve 116 can be driven by a valve control system 135 to selectively limit all or a portion of the compressed air flow from reaching the air turbine starter 120.

The air turbine starter 120 of the engine starting system 100 is operably connected to the starting spool 32 of the gas turbine engine 20 of FIG. 1 through an accessory gearbox 70 and drive shaft 60 (e.g., a tower shaft), as shown in FIG. 2. As depicted in the example of FIG. 2, the air turbine starter 120 is connected to the starting spool 32 by a drive line 90, which runs from an output of the air turbine starter 120 to the accessory gearbox 70 through the drive shaft 60 to rotor shaft 50 of the gas turbine engine 20 of FIG. 1. Operable connections can include gear mesh connections that in some instances can be selectively engaged or disengaged, for instance, through one or more clutches. The air turbine starter 120 is configured to initiate a startup process of the gas turbine engine 20 driving rotation of the rotor shaft 50 of starting spool 32 including high pressure compressor 52 and high pressure turbine 54. Once the startup process has been completed, the air turbine starter 120 can be disengaged from the starting spool 32 to prevent over-speed conditions when the gas turbine engine 20 operates at its normal higher speeds. Although only a single instance of an engine compressor-turbine pair of starting spool 32 is depicted in the example of FIG. 2, it will be understood that embodiments can include any number of spools, such as high/mid/low pressure engine compressor-turbine pairs within the gas turbine engine 20.

The air turbine starter 120 is further operable to drive rotation of the rotor shaft 50 at a lower speed for a longer duration than typically used for engine starting in a motoring mode of operation (also referred to as cool-down motoring) to prevent/reduce a bowed rotor condition. If a bowed rotor condition has developed, for instance, due to a hot engine shutdown and without taking further immediate action, cool-down motoring may be performed by the air turbine starter 120 to reduce a bowed rotor condition by driving rotation of the rotor shaft 50.

Figure 3:
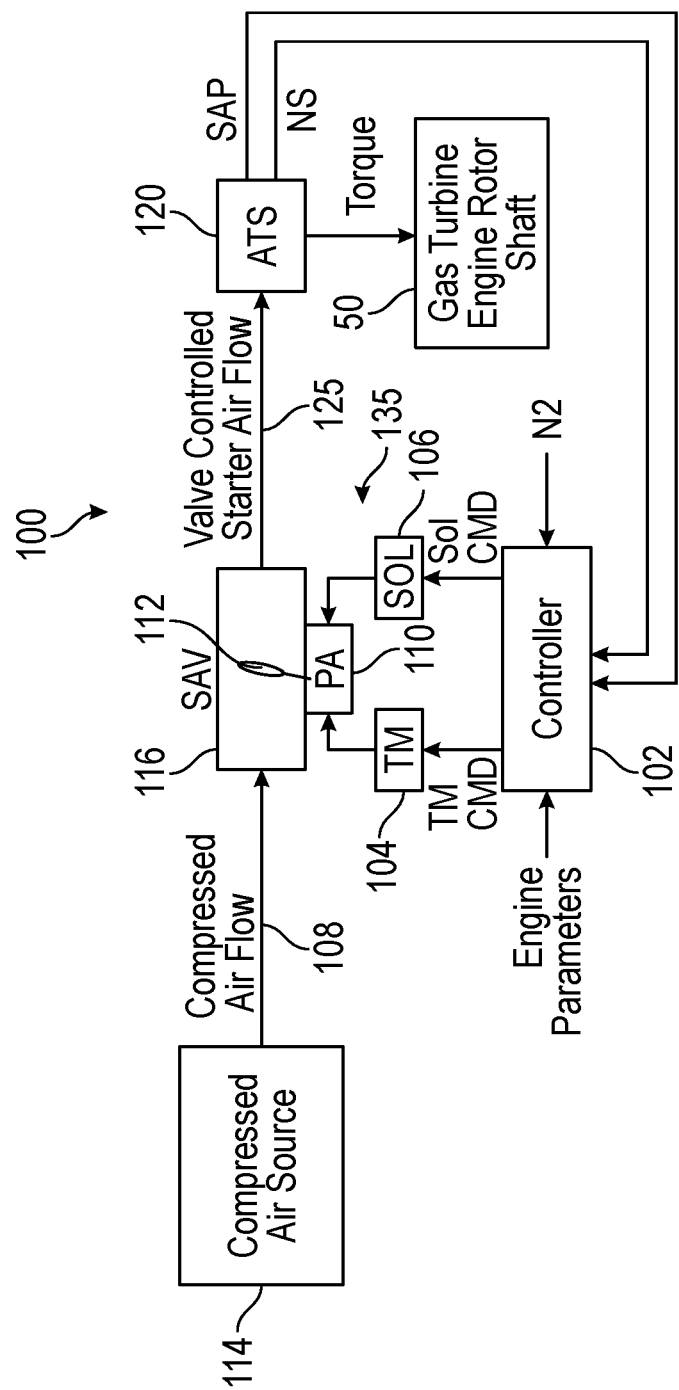
FIG. 3 is another schematic illustration of an aircraft engine starting system in accordance with an embodiment of the disclosure.

As depicted in FIG. 3, a controller 102, such as full authority digital engine control (FADEC), typically controls valve operation of the starter air valve 116 through the valve control system 135 to control a motoring speed of the gas turbine engine 20 during cool-down motoring. In the example of FIG. 3, the valve control system 135 includes a variable-position electromechanical device 104, such as a torque motor, and a discrete-position electromechanical device 106, such as a solenoid. The variable-position electromechanical device 104 is dynamically adjustable to set and hold a wide range of intermediate positions between fully opened and fully closed (e.g., 0% open, 25% open, 50% open, 75% open, 100% open, etc.) responsive to a current command, such as torque motor command, from the controller 102. The discrete-position electromechanical device 106 is an on-off device that is typically commanded either opened or closed responsive to a current command, such as a solenoid command, from the controller 102. Both the variable-position electromechanical device 104 and the discrete-position electromechanical device 106 are operable to adjust positioning of a pneumatic actuator 110 that in turn drives rotation of the valve plate 112 of the starter air valve 116 to establish a valve-controlled starter air flow 125 to the air turbine starter 120 based on compressed air flow 108 from the compressed air source 114.

The controller 102 can control operation of the gas turbine engine 20 of FIG. 1 and the engine starting system 100 of FIGS. 2 and 3. In an embodiment, the controller 102 can include memory to store instructions that are executed by one or more processors on one or more channels. The executable instructions may be stored or organized in any manner and at any level of abstraction, such as in connection with a controlling and/or monitoring operation of the gas turbine engine 20 of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

The controller 102 can be configured with control laws to maintain a motoring speed below a threshold level (i.e., the resonance speed) for the gas turbine engine 20 of FIG. 1 while performing cool-down motoring based on the compressed air source 114. In embodiments, the controller 102 can observe various engine parameters and starting system parameters to actively control cool-down motoring and prevent fault conditions from damaging the gas turbine engine 20. For example, controller 102 can observe engine speed (N2) of gas turbine engine 20 and may receive starter system parameters such as starter speed (NS) and/or starter air pressure (SAP) for closed loop control of the starter air valve 116 using by commanding either or both of the variable-position electromechanical device 104 and the discrete-position electromechanical device 106.

Under normal operating conditions, one or more channels of the controller 102 can set and optionally dynamically adjust variable positioning of the variable-position electromechanical device 104 to respectively control the pneumatic actuator 110 to drive rotation of valve plate 112 to achieve a desired position (e.g., a partially open position) of the starter air valve 116 and control delivery of compressed air flow 108 from compressed air source 114 as valve-controlled starter air flow 125 to air turbine starter 120 during cool-down motoring. The air turbine starter 120 outputs torque to drive rotation of rotor shaft 50 of the starting spool 32 of the gas turbine engine 20 of FIG. 1. The controller 102 can monitor engine speed (N2), starter speed (NS), starter air pressure (SAP), and/or other engine parameters to determine an engine operating state and control the starter air valve 116. Thus, the controller 102 can establish a control loop with respect to a motoring speed (N2 and/or NS) and/or starter air pressure (SAP) to adjust positioning of the starter air valve 116. In some embodiments, the controller 102 can monitor a valve angle of the valve plate 112 when valve angle feedback is available. The controller 102 can establish an outer control loop with respect to motoring speed and an inner control loop with respect to the valve angle of the valve plate 112 of the starter air valve 116.

In the event of a failure of the variable-position electromechanical device 104, the discrete-position electromechanical device 106 can be driven by the controller 102 using pulse width modulation to alternate on and off commands to dither the pneumatic actuator 110 about a target setting to achieve a partially open position of the valve plate 112 of the starter air valve 116 and control the compressed air flow 108 from the compressed air source 114 as the valve-controlled starter air flow 125 to the air turbine starter 120 during cool-down motoring. The discrete-position electromechanical device 106 is designed as an on/off valve that is typically commanded to either fully opened or fully closed. However, there is a time lag to achieve the fully open position and the fully closed position. By selectively alternating an on-command time with an off-command time, intermediate positioning states (i.e., partially opened/closed) can be achieved through the pneumatic actuator 110 and valve plate 112. The controller 102 can modulate the on and off commands (e.g., as a duty cycle using pulse width modulation) to the discrete-position electromechanical device 106 to further open the starter air valve 116 and increase a rotational speed of the rotor shaft 50.

Figure 4:
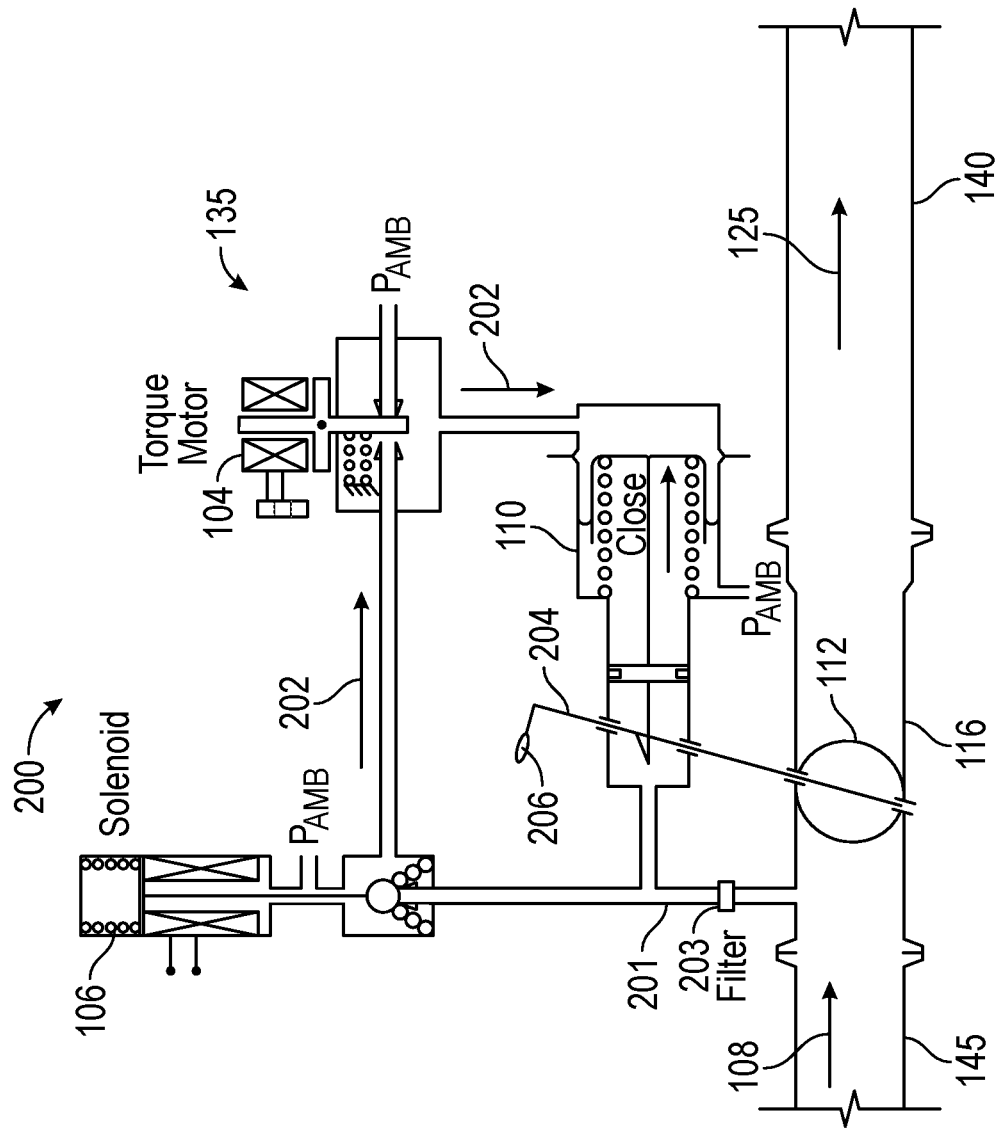
FIG. 4 is a schematic illustration of a starter air valve system with dual electromechanical controls in accordance with an embodiment of the disclosure.

FIG. 4 depicts a schematic illustration of a starter air valve system 200 with dual electromechanical controls in accordance with an embodiment. The starter air valve system 200 illustrates one example of the valve control system 135 where the variable-position electromechanical device 104 is positioned in a pneumatic flow path 202 between the discrete-position electromechanical device 106 and the pneumatic actuator 110. The discrete-position electromechanical device 106 may be a pull shutoff solenoid that defaults to a closed position using a spring such that electrical power is not continuously needed during flight to keep the starter air valve 116 closed. The discrete-position electromechanical device 106 can allow or block a portion of the compressed air flow 108 in supply line 201 from reaching the pneumatic flow path 202 after passing through a filter 203. The variable-position electromechanical device 104 can default to an open position to allow the discrete-position electromechanical device 106 to control the pneumatic actuator 110 without obstruction by the variable-position electromechanical device 104. In the event that the variable-position electromechanical device 104 fails, the discrete-position electromechanical device 106 can pulse pressure in the pneumatic flow path 202 to establish a pressure differential in the pneumatic actuator 110 to turn a valve shaft 204 that drives rotation of the valve plate 112. A manual override 206 can be used to manually rotate the valve shaft 204 to open the valve plate 112 within the starter air valve 116, for instance, upon a failure of the pneumatic actuator 110 such that a least a portion of the compressed air flow 108 can pass from one or more ducts 145 to at least one duct 140 as valve-controlled starter air flow 125.

Figure 5:
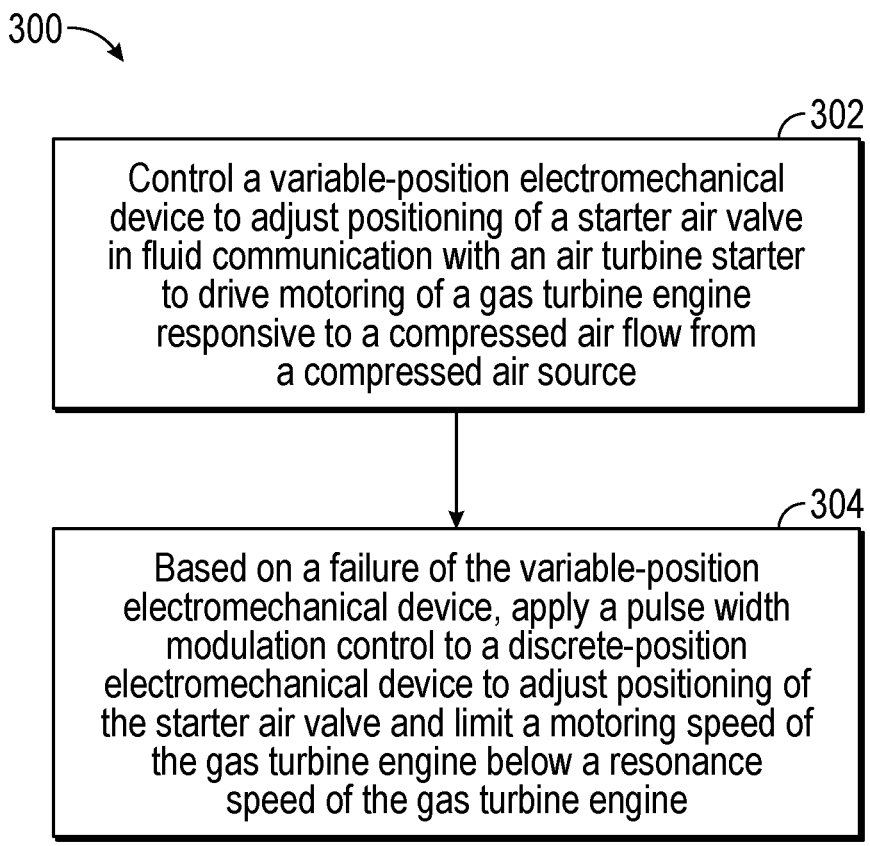
FIG. 5 is a flow chart illustrating a method in accordance with an embodiment of the disclosure.

FIG. 5 is a flow chart illustrating a method 300 for gas turbine engine motoring in accordance with an embodiment. The method 300 of FIG. 5 is described in reference to FIGS. 1-4 and may be performed with an alternate order and include additional steps. Before initiating bowed rotor start mitigation, a bowed rotor determination step can be performed to estimate a need for bowed rotor start mitigation. Examples include the use of models and/or stored/observed engine/aircraft state data of the gas turbine engine 20.

At block 302, controller 102 controls a variable-position electromechanical device 104 to adjust positioning of a starter air valve 116 in fluid communication with an air turbine starter 120 to drive motoring of a gas turbine engine 20 responsive to a compressed air flow 108 from a compressed air source 114. The compressed air source 114 can be an auxiliary power unit, a ground cart, or a cross-engine bleed from another engine (not depicted). Rotation of a valve plate 112 of the starter air valve 116 can be driven by a pneumatic actuator 110 to establish a valve-controlled starter air flow 125 to the air turbine starter 120 based on the compressed air flow 108. The variable-position electromechanical device 104 and a discrete-position electromechanical device 106 can be pneumatically coupled to the pneumatic actuator 110. The variable-position electromechanical device 104 can be positioned in a pneumatic flow path 202 between the discrete-position electromechanical device 106 and the pneumatic actuator 110, and the variable-position electromechanical device 104 can default to an open position. The variable-position electromechanical device 104 can be a torque motor, and the discrete-position electromechanical device 106 can be a solenoid, for example.

At block 304, based on a failure of the variable-position electromechanical device 104, the controller 102 applies a pulse width modulation control to the discrete-position electromechanical device 106 to adjust positioning of the starter air valve 116 and limit a motoring speed of the gas turbine engine 20 below a resonance speed of the gas turbine engine 20. The variable-position electromechanical device 104 can be dynamically commanded and/or pulse width modulation of the discrete-position electromechanical device 106 can be commanded based on one or more of: the motoring speed (e.g., N2) of the gas turbine engine 20 and a speed (e.g., NS) of the air turbine starter 120.

Accordingly and as mentioned above, it is desirable to detect, prevent and/or clear a "bowed rotor" condition in a gas turbine engine that may occur after the engine has been shut down. As described herein and in one non-limiting embodiment, the controller 102 may be programmed to automatically take the necessary measures in order to provide for a modified start sequence without pilot intervention other than the initial start request. In an exemplary embodiment, the controller 102 comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the controller 102 may include, but not be limited to, a processor(s), computer(s), memory, storage, register(s), timing, interrupt(s), communication interfaces, and input/output signal interfaces, as well as combinations comprising at least one of the foregoing. For example, the controller 102 may include input signal filtering to enable accurate sampling and conversion or acquisitions of such signals from communications interfaces. As described above, exemplary embodiments of the disclosure can be implemented through computer-implemented processes and apparatuses for practicing those processes.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system of a gas turbine engine, the system comprising:
   an air turbine starter coupled to a rotor shaft of the gas turbine engine;
   a starter air valve comprising a valve plate configured to provide fluid communication between a compressed air source and the air turbine starter;
   a pneumatic actuator in fluid communication with the compressed air source and coupled to the valve plate to establish a valve-controlled starter air flow to the air turbine starter based on a compressed air flow from the compressed air source;
   a discrete-position electromechanical device in fluid communication with the pneumatic actuator and configured to control delivery of a portion of the compressed air flow to adjust positioning of the valve plate using the pneumatic actuator;
   a variable-position electromechanical device in fluid communication with the discrete-position electromechanical device and the pneumatic actuator, the variable-position electromechanical device configured to control delivery of the portion of the compressed air flow to adjust positioning of the valve plate using the pneumatic actuator; and
   a controller coupled to the discrete-position electromechanical device and the variable-position electromechanical device, the controller comprising a processor and memory programmed with a plurality of instructions executable by the processor to cause the controller to command a pulse width modulation of the discrete-position electromechanical device, responsive to a failure of the variable-position electromechanical device, to limit a motoring speed of the gas turbine engine below a resonance speed of the gas turbine engine based on a detected motoring speed of the gas turbine engine, wherein the pulse width modulation alternates a sequence of on and off commands to dither the pneumatic actuator about a target setting to achieve a partially open position of the valve plate.

2. The system as in claim 1, wherein the compressed air source is an auxiliary power unit, a ground cart, or a cross-engine bleed.

3. The system as in claim 1, wherein the variable-position electromechanical device is positioned in a pneumatic flow path between the discrete-position electromechanical device and the pneumatic actuator, and the variable-position electromechanical device defaults to an open position.

4. The system as in claim 3, wherein the variable-position electromechanical device is a torque motor, and the discrete-position electromechanical device is a solenoid.

5. The system as in claim 1, wherein further configured to dynamically command the variable-position electromechanical device and to command pulse width modulation of the discrete-position electromechanical device based on one or more of: the motoring speed of the gas turbine engine and a speed of the air turbine starter.

6. A gas turbine engine comprising:
   a starting spool coupled to a gearbox;
   an air turbine starter coupled to the gearbox;
   a starter air valve comprising a valve plate configured to provide fluid communication between a compressed air source and the air turbine starter;
   a pneumatic actuator in fluid communication with the compressed air source and coupled to the valve plate to establish a valve-controlled starter air flow to the air turbine starter based on a compressed air flow from the compressed air source;
   a discrete-position electromechanical device in fluid communication with the pneumatic actuator and configured to control delivery of a portion of the compressed air flow to adjust positioning of the valve plate using the pneumatic actuator;
   a variable-position electromechanical device in fluid communication with the discrete-position electromechanical device and the pneumatic actuator, the variable-position electromechanical device configured to control delivery of the portion of the compressed air flow to adjust positioning of the valve plate using the pneumatic actuator; and
   a controller coupled to the discrete-position electromechanical device and the variable-position electromechanical device, the controller comprising a processor and memory programmed with a plurality of instructions executable by the processor to cause the controller to command a pulse width modulation of the discrete-position electromechanical device, responsive to a failure of the variable-position electromechanical device, to limit a motoring speed of the gas turbine engine below a resonance speed of the gas turbine engine based on a detected motoring speed, wherein the pulse width modulation alternates a sequence of on and off commands to dither the pneumatic actuator about a target setting to achieve a partially open position of the valve plate.

7. The gas turbine engine as in claim 6, wherein the compressed air source is an auxiliary power unit, a ground cart, or a cross-engine bleed.

8. The gas turbine engine as in claim 6, wherein the variable-position electromechanical device is positioned in a pneumatic flow path between the discrete-position electromechanical device and the pneumatic actuator, and the variable-position electromechanical device defaults to an open position.

9. The gas turbine engine as in claim 8, wherein the variable-position electromechanical device is a torque motor, and the discrete-position electromechanical device is a solenoid.

* * * * *